July 9, 1929.  G. V. ROBERTS, JR  1,720,573
MACHINE FOR MIXING DRY AND LIQUID MATERIALS
Filed March 2, 1929
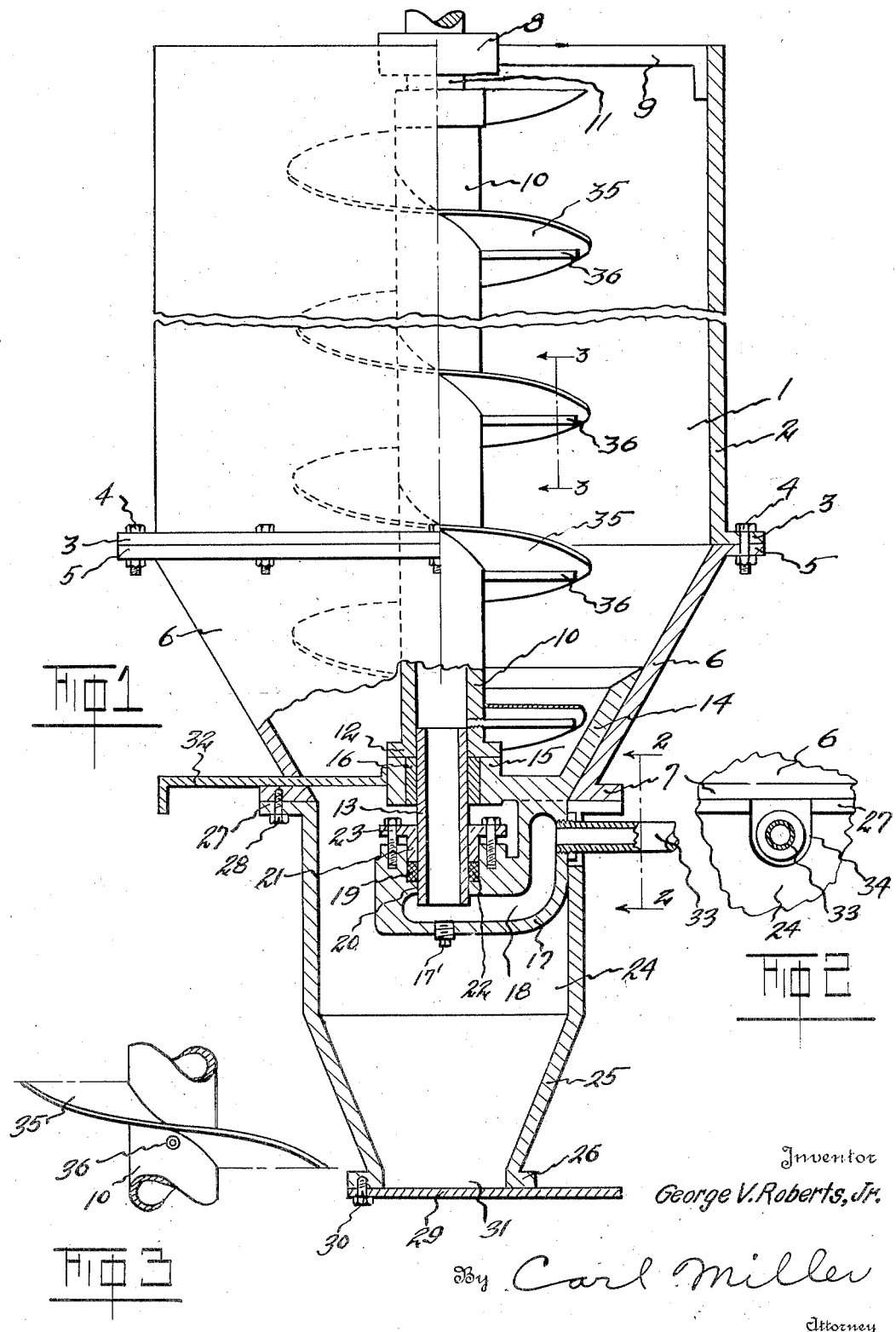
Inventor
George V. Roberts, Jr.
By Carl Miller
Attorney Patented July 9, 1929.

1,720,573

UNITED STATES PATENT OFFICE.

GEORGE V. ROBERTS, JR., OF PORT BYRON, NEW YORK.

MACHINE FOR MIXING DRY AND LIQUID MATERIALS.

Application filed March 2, 1929. Serial No. 344,031.

This invention relates to a machine adapted to mix dry and liquid materials and more particularly to a machine of the type disclosed in the patent to Lionel True, #1,691,535, Nov. 13, 1928, employed for mixing molasses and a dry pulverulent material as for example stock feeds, in order to increase the food value thereof and render the same more palatable.

Hitherto machines for this purpose have applied the molasses on the upper surface of the feed as it is slowly agitated by some member within the mixing chamber. As is well known this type of machine is exceedingly inefficient due to the manner in which the molasses is supplied in that little piles of molasses will form on the slowly moving surface of the feed causing lumps containing an unduly high percentage of molasses in the feed after it is mixed.

This invention contemplates to obviate this disadvantage by providing a plurality of discharge pipes extending transversely of the vertical hollow shaft and in communication with the interior thereof, said pipes being positioned a slight distance below the under surface of the helicoid conveyor secured to said shaft and terminating short of the outer edge thereof, the molasses being supplied to the lower end of said shaft through a suitable means. This position of the discharge pipes will result in an exceedingly uniform mixture due to the fact that as the feed moves along there will be no possibility for puddles of molasses to form.

Another object of this invention is to form the mixing chamber in two parts whereby the same may be easily disassembled to clean the interior thereof.

Other objects of this invention will become apparent as the detailed description thereof given below will indicate, reference being now had to the accompanying drawing wherein:—

Figure 1 is an elevation partly in section of the mixing chamber and the means whereby the molasses is supplied to the hollow shaft.

Figure 2 is a detail view taken on line 2—2, of Figure 1 and

Figure 3 is a detail view taken on line 3—3, of Figure 1.

A mixing chamber 1 comprising an upper cylindrical member 2 having a flange 3 formed on its lower end is adapted to be connected by means of the bolts 4 to the upper flange 5 of the conical member 6 which also terminates in a lower flange 7.

The mixing chamber 1 may be open at the top but it is preferably closed so that the contents of the chamber will be more sanitary, and has fastened thereto and centrally thereof a bearing support 8 formed intermediate the arms 9 which are riveted or otherwise secured to the cylinder 2. A hollow shaft 10 has rigidly secured thereto and interiorly thereof in any desired manner, a stud shaft 11 which is adapted to fit within the upper bearing support 8. The lower end of the hollow shaft 10 terminates in a flange 12 and has rigidly secured thereto and interiorly thereof in any desired manner a hollow stud shaft 13. A bearing support 14, comprising a boss 15 having a bronze bushing 16 fitted therein is rigidly attached to the wall of the conical member 6 by means of rivets, or any other suitable means not shown. The hollow stud shaft 13 fits within said bushing 16, the flange 12 of the main shaft 10 resting on said boss 15, the stud shaft 13 extending downwardly from said bearing as clearly shown in Figure 1.

Integrally formed with the bearing support 14 is a depending substantially right angular bracket 17 having a similar shaped cored passage 18 formed therein. The upper portion of the free arm of the braket 17 has formed therein a recess 19 and a hole 20 of a reduced diameter, thru which the end of the hollow stud shaft 13 is adapted to pass. A plug 17' is provided in the under surface of the bracket 17 in alignment with the hollow shaft 10 whereby the same may be removed to clean the interior of said bracket and said hollow shaft. A flanged member 21 is adapted to fit within the recess 19 which is stuffed with a suitable packing 22, the pressure applied on said packing 22 by the member 21 being adjusted through the medium of the bolts 23, said elements forming a fluid tight stuffing box.

A chamber 24 having a lower conical portion 25 has formed thereon upper and lower flanges 26 and 27, the flange 27 abutting the flange 7 and being rigidly secured thereto by the bolts 28. A closure plate 29 is pivoted to the flange 26 as at 30 and is adapted to swing clear of the opening 31 in the container 24 to allow the mixed feed to flow out into bags or other means to hold the same. A similar closure plate 32 is provided between the container 24 and the conical portion 6 of the mixing chamber 1 to prevent any of the mixture to enter the container 24 until it is thoroughly mixed, said closure plate being either swingable or adapted to slide in or out in the manner as is well known in the art.

A pipe 33 is screwed into engagement with the bracket 17, said pipe conveying the molasses under pressure from a pump not shown. The container 24 has a U-opening 34 therein to accommodate the pipe 33, see Figure 2.

Rigidly secured to the hollow main shaft 10 is a spiral or helicoid conveyor 35. Slightly below each convolution of the conveyor 35 is a discharge pipe 36 connected with the interior of the main shaft 10 as clearly shown in Figures 1 and 3, said discharge pipe being of such a length as to terminate short of the outer edge of said conveyor as clearly shown in Figure 1. The discharge pipes 36 are disposed in this position so that they are protected by the conveyor proper above it.

The molasses is pumped through the pipe 33 into the cored passage 18 and upwardly through the interior of the main shaft 10 and discharging in a continuous stream through the discharge pipes 36. The feed is supplied to the mixing chamber 1 through the top. As the conveyor 35 rotates with the shaft 10 the feed will pass by the discharge openings of the discharge pipes in a uniform manner and will uniformly be mixed with the molasses to make a homogeneous mixture. It will be next to impossible for puddles of molasses to form in the feed, in that it is immediately removed from the opening of the discharge pipe 36 on account of the rapid rotary movement of the end of said pipes past the particles of feed.

It is to be distinctly understood that I do not desire to limit this invention to the type of mixing machine described above, in that the same may advantageously be employed in a Hammermill grinder which is specially designed to grind corn feed and the like and thereby mix the molasses with the same while grinding. This invention may also be advantageously employed in horizontal mixing machines.

It is further to be understood that even though the liquid has been described as being supplied to the lower end of the shaft through a suitable means, it likewise is to be understood that the liquid may be also supplied to the upper end of the shaft, or in either end of the shaft as may be desired.

Having thus described and illustrated the invention, what is claimed as new and which it is desired to secure by Letters Patent is:—

1. In combination with a mixing chamber, a hollow shaft rotatably mounted therein, a helicoid conveyor secured to said shaft, means for positively supplying a liquid to the interior of said shaft, and a plurality of discharge pipes arranged perpendicular to the longitudinal axis of said shaft and positioned a slight distance below the under surface of said conveyor, in order to be protected thereby.

2. In combination with a mixing chamber, bearing members secured to the opposite ends thereof, a hollow shaft rotatably mounted in said bearings and having the open end thereof extending through one of said bearings, a helicoid conveyor secured to said shaft, a plurality of discharge pipes arranged perpendicular to the longitudinal axis of said hollow shaft and positioned a slight distance below the under surface of said conveyor, a stuffing box constituting an integral portion of said last mentioned bearing member and adjacent thereto, and adapted to encompass the extending end of said shaft, a cored passage adjacent to said stuffing box and in communication with the end of said shaft, and means for supplying a liquid to said cored passage.

3. In combination with a mixing chamber, bearing members secured to the opposite ends thereof, a hollow shaft open at one end rotatably supported in said bearing members and having said open end extending through its supporting bearing, a substantially right angle bracket forming an integral part of said last mentioned bearing, a stuffing box on the free leg of said bracket adapted to encompass the extending end of the shaft, a cored passage in said bracket in communication with said hollow shaft, and means connected to said cored passage to supply a liquid under pressure to the interior of said shaft.

4. In combination with a mixing chamber, a hollow shaft open at one end rotatably mounted therein, a helicoid conveyor secured to said shaft, means for positively supplying a liquid under pressure to the interior of said shaft, a plurality of discharge pipes arranged perpendicular to the longitudinal axis of said shaft and in communication with the interior thereof, said discharge pipes terminating short of the outer edge of said conveyor and being positioned a slight distance beneath the under surface thereof.

5. In combination with a mixing chamber, a hollow shaft open at its lower end and rotatably mounted therein, a helicoid conveyor secured to said shaft, means to supply a dry material to said mixer, means for positively supplying a liquid under pressure to the interior of said shaft at its lower end, and a plurality of discharge pipes arranged transverse to said hollow shaft and positioned beneath the under surface of said conveyor, and terminating short of the outer edge thereof.

6. In combination with a mixing chamber, a hollow vertical shaft, a helicoid conveyor secured thereto and rotatable therewith, means to supply a liquid under pressure to the bottom of said shaft, means to supply a dry material to the interior of said container, means to admit the liquid to mix with said dry material, and means whereby said container may readily be disassembled to clean the interior thereof.

GEORGE V. ROBERTS, Jr.